Jan. 10, 1950　　　H. SCHAEVITZ　　　2,494,493
DIFFERENTIAL TRANSFORMER
Filed Aug. 24, 1948
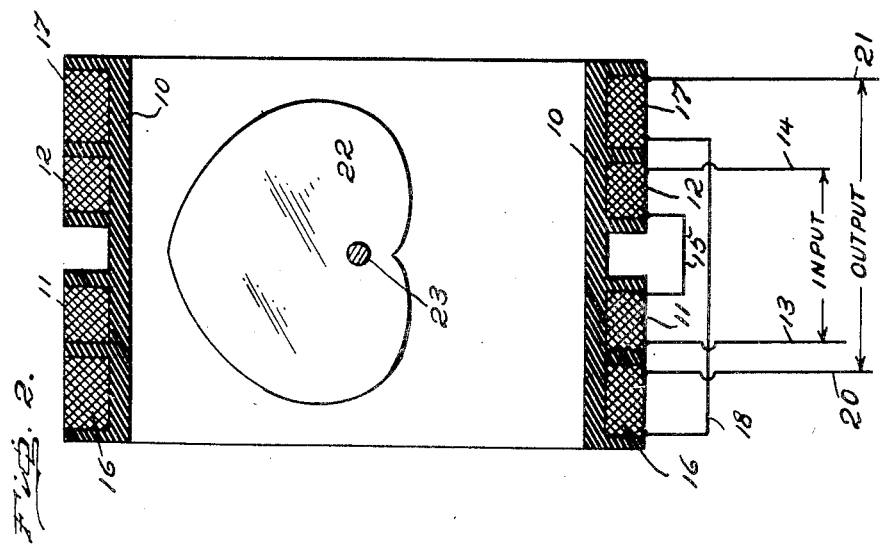
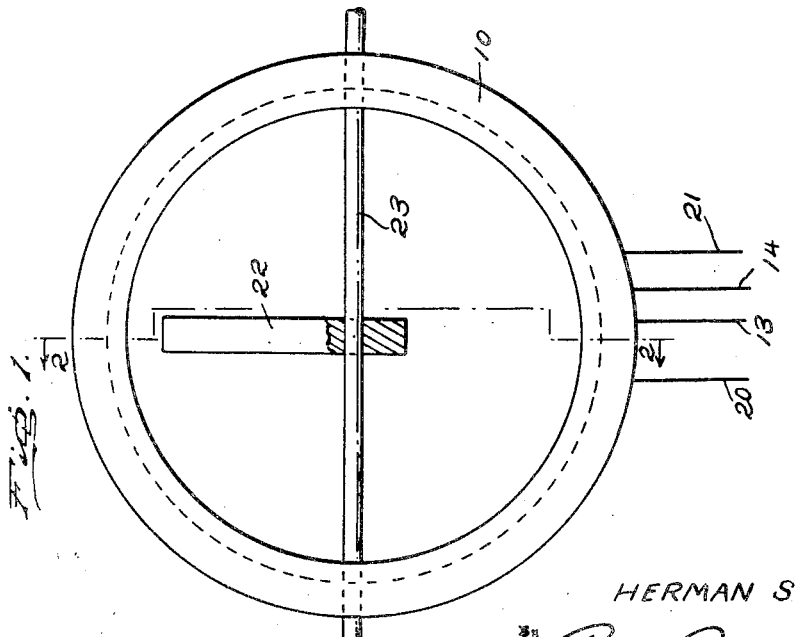
Inventor
HERMAN SCHAEVITZ.
By Barr, Borden & Fox
Attorney Patented Jan. 10, 1950

2,494,493

UNITED STATES PATENT OFFICE 2,494,493

DIFFERENTIAL TRANSFORMER

Herman Schaevitz, Collingswood, N. J.

Application August 24, 1948, Serial No. 45,965

11 Claims. (Cl. 171—119)

This present invention relates to electro-magnetic motion responsive devices and more particularly to an electrical transducer or differential transformer responsive to angular motions, or positions.

Some of the objects of the present invention are: to provide an improved electro-magnetic motion responsive device; to provide an electro-magnetic device responsive to angular motions; to provide an electro-magnetic device as a medium for translating angular variations of a moving body into linear indications or recordings as a function of such angular variations; to provide a differential transformer wherein the electrical output from the secondary coils is controlled in accordance with the angular position of a core which is eccentrically mounted for rotation about a given axis; to provide a differential transformer wherein the core is mounted for rotary movement and is preshaped as to its mass distribution whereby the output of the transformer can be predeterminedly plotted as linear, square root, logarithmic, or other graph form; to provide a differential transformer wherein a core having a predetermined profile is provided, which core is asymmetrically mounted for rotation about an axis disposed at right angles to the axis of the transformer coils; to provide a differential transformer wherein a rotatable core is provided of irregular profile and having a length parallel to the axis of the transformer coils which is substantially constant in all angular positions of said core; to provide an electro magnetic device responsive to settings of angular positions or to changes of angular position; and to provide other improvements as will hereinafter appear.

In the accompanying drawings, Fig. 1 represents a side elevation of an electrical transducer embodying one form of the present invention; and Fig. 2 represents a section on line 2—2 of Fig. 1.

Referring to the drawings, one form of the present invention comprises an annular base 10 of suitable non-magnetic, and preferably non-ducting, material, such as Bakelite, rubber, or the like, having a plurality of circumferential grooves arranged in side-by-side spaced apart relation. As shown, two sections of a primary coil 11 and 12 of fine enameled wire or its equivalent are respectively wound in the two inner grooves and connected in series relation for energization by an input voltage (either A. C. or D. C.) as indicated by the conductor terminals 13 and 14. The conductor 15 leads from the output of one primary coil section to the input of the other primary coil section to establish the aforesaid series relation.

Two secondary coils 16 and 17 of similar suitable wire are wound respectively in the two outer grooves, each being identical to the other and equally spaced from its adjacent primary coil section. The coils 16 and 17 are connected in electrical opposition as indicated by the conductor 18 and the terminal conductors 20 and 21, which latter form the output leading to any well known form of indicating or recording apparatus. While the foregoing arrangement of the primary and secondary coils is the preferred construction, the arrangement may be changed without departing from the invention, namely by winding the primary sections in the outer grooves and the secondaries in the inner grooves.

For the purpose of varying the magnetic coupling between the primary coil and the secondary coils, a core 22 of magnetic material is provided, the same being mounted for rotation with a shaft 23, which extends transversely within the coil unit with its opposite ends projecting through the space between the primary coil sections to the outside of the unit where one end can be connected to a position changing body or other variable torque transmitting or angular setting responsive means. Thus, as shown in Fig. 2, the shaft 23 extends diametrically of the coil unit with its axis of rotation perpendicular to the axis of the coil unit. In the present instance the core 22 is in the form of a relatively thin plate of predetermined irregular contour, such, for example, of heart shape asymmetrically mounted with respect to the shaft 23. Preferably, the length of this core 22, measured in a direction parallel to the coil axis, is constant for any angular position of the core, but is shiftable along the axis of the coils as the core assumes different angular positions. The net effect of core rotation is therefore a shift of this length axially through the coils, and hence the flux linkage between the primary and each of the secondaries will depend upon the angular position of the core 22. In the present illustrative arrangement with the secondaries connected in opposition, the output will have a minimum value for the core position shown and larger values for other positions. Also, with the core shape shown, the output from the secondaries will be so proportioned to the angular position of the core as to result in a linear graph of the said output. In the position shown in Fig. 2, the core effect is to balance the secondary coils in null output relation, but any angular movement of the core, either clockwise or counter-clockwise will cause coil unbalance. If the input is A. C. to the primary, the output of the coupled secondaries will be a voltage of given phase, depending upon which secondary output preponderates over the other, which, of course, varies with the direction of unbalancing movement or unbalanced setting of the core. The preponderating A. C. output of the transformer will thus be a signal either of movement of the core or of the position of the core, and the amplitude thereof will be a function of the angular departure from the symmetrical null position. If the input is D. C. it will be observed that the output will be a function of the angular motion of the core.

It is also pointed out that the profile of the core can be predetermined so as to produce a predetermined output relative to the angular movement of the core, so that instead of a linear output, one giving a square root or logarithmic or other desired functional graph can be obtained, according to necessities of a given installation. All such illustrated or alternative forms of core give an output as a predetermined function of angular motion or position.

While for simplicity the coils of the transformer are illustratively shown as circular, the invention is not limited to such coil configuration and other shapes may be used. For instance, and this form is presently preferred, the coil configuration is rectangular as thereby leakage fluxes are cut down between the core and the coil.

Finally, among the important uses of the invention, in addition to an illustrative use in aircraft as signals of angular position or movements of control or other components of the craft, is the use of a coordinated pair of the transformers as a torque meter. With a properly shaped core driven by one end of a flexible shaft in one transformer and with the same shaped core driven by the other end of the shaft in the other transformer, having identical outputs when the shaft is at rest, the lag or lead of the respective outputs with torsion in the shaft, or any other relative attributes of the two signals, can be used as a measure of the twist of such shaft.

Having thus described my invention, I claim:

1. An electro-magnetic unit comprising two coaxially aligned and spaced air core secondary coils connected in electrical opposition and having terminals for a voltage output, a primary coil inductively coupled to said secondary coils and having input connections for a source of current, a core of magnetizable material comprising a substantially flat disc rotatably mounted within said secondary coils on a rotor axis normal to the flat disc and normal also to the common axis of the secondary coils, said flat disc being of irregular profile which in axial projection surrounds and encloses said rotor axis and being symmetrical about a plane diametrical of the rotor axis bisecting said disc, and means responsive to a transmitted torque for turning said core about its axis, whereby said output is proportioned as a function of such angular motion.

2. An electro-magnetic unit comprising two air core secondary coils mounted in coaxial alignment connected in electrical opposition and having terminals for a voltage output, a primary coil inductively coupled to said secondary coils and having an input from a source of current, a core of magnetizable material comprising a substantially flat plate rotatably mounted within said secondary coils on a rotor axis eccentric of the plate and with a plate surface parallel to the common axis of the secondary coils, said plate being symmetrical about a bisecting plane diametrical of said rotor axis, and means responsive to a transmitted torque for turning said core about its axis, whereby said output is proportioned as a function of such angular motion.

3. An electro-magnetic unit comprising two secondary coils connected in electrical opposition and having terminals for a voltage output, a primary coil inductively coupled to said secondary coils and having an input from a source of current, a core of magnetizable material rotatably mounted within said secondary coils, said core having a substantially heart-shaped profile, and means responsive to a transmitted torque for turning said core about its axis, whereby said output is proportioned as a function of such angular motion.

4. An electro-magnetic unit comprising two coaxially aligned and spaced air core secondary coils connected in electrical opposition and having terminals for a voltage output, a primary coil inductively coupled to said secondary coils and having an input from a source of alternating current, and means, including a core of magnetizable material, rotatably mounted within said secondary coils, said core having a non-uniform profile and mounted on a rotor axis normal to the common axis and eccentric to and enclosed and surrounded by an axial projection of the profile of said core, said core being substantially symmetrical about a bisecting plane diametrical of the said rotor axis for producing output voltages with linearly developing values with successive uniform angular changes over a selected range corresponding to an incremental progression of angular positions of said core, said means being responsive to a transmitted torque.

5. An electro-magnetic unit comprising two coaxially spaced secondary coils connected in electrical opposition and having terminals for a voltage output, a primary coil inductively coupled to said secondary coils and having an input from a source of alternating current, and means, including a substantially heart-shaped core of magnetizable material rotatably mounted within said secondary coils, for producing output voltages with linearly developing values corresponding to an incremental progression of angular positions of said core, said means being responsive to a transmitted torque.

6. An electro-magnetic unit comprising two secondary coils connected in electrical opposition and having terminals for a voltage output, a primary coil inductively coupled to said secondary coils and having an input from a source of alternating current, and means, including a substantially heart-shaped core of magnetizable material rotatably mounted within said secondary coils, for producing output voltages with linearly developing values corresponding to an incremental progression of angular positions of said core, said means being responsive to a transmitted torque.

7. An electro-magnetic unit comprising two coaxially aligned and spaced air core secondary coils connected in electrical opposition and having terminals for a voltage output, a primary coil inductively coupled to said secondary coils and having an input from a source of current, a core of magnetizable material and of irregular profile located within said secondary coils, and a shaft eccentrically supporting said core for rotation therewith on an axis transverse of the axis of the secondary coils, said shaft projecting from the unit for attachment to a torque transmitting medium, whereby angular motion of said core controls said voltage output as a function of the transmitted torque.

8. An electro-magnetic unit comprising two coaxially aligned and spaced air core secondary coils connected in electrical opposition and having terminals for a voltage output, a primary exciting coil inductively associated with both coils and having an input for coupling with a source of voltage, a planar disc core of predetermined profile, and means mounting the core for angular movement relative to and within said secondary coils about an axis eccentric to said profile and normal to the axis of said coils from a position of null output from said secondaries to positions angularly divergent from the position of null output whereby said output is predeterminedly a desired resultant comprising a function of the angular divergence of said core from the said position of null output in a selected sense.

9. An electro-magnetic unit comprising an air core exciting coil and a pair of air core secondary coils disposed in annular concentric axial alignment, said secondary coils coupled in opposition to furnish a resultant output, a planar disc core mounted within said coils with the major flat surfaces thereof parallel to the axis of the aligned coils and arranged for angular position change relative to said secondaries about an axis eccentric of the disc and normal to a major flat surface thereof so as to modify the said resultant output as a function of such position change.

10. An electro-magnetic unit comprising a primary exciting air core coil and a pair of secondary air core coils in aligned concentric relation, said secondaries coupled in opposition to furnish a resultant output, a shaft mounted for angular motion relative to the secondaries on an axis normal to the axis of the secondaries, a core of non-uniform profile mounted on the shaft said core profile in axial projection surrounding and enclosing said shaft eccentrically of the axis of the shaft, said unit having input connections for a source of current and output connections from the coupled secondaries, said core being symmetrical about a single plane bisecting the core diametrical of said shaft and asymmetrical about all other bisecting planes diametrical of said shaft, said rotor shaft being normal to the disc and to the common axis of the secondary coils, whereby with the said single plane disposed parallel to and between the respective secondaries there are equal core masses inductively effective on the respective secondaries to furnish a null output from the coupled secondaries, to furnish an output of alternate plus and minus voltages separated by null voltages with and during movement of the core when the exciting coil is fed D. C. voltage, and of A. C. voltages of alternately one phase and of opposite phase separated by null voltage when the exciting coil is fed A. C. voltage, as functions of movement of the core relative to said secondary coils.

11. An electro-magnetic unit comprising a primary exciting air core coil and a pair of secondary air core coils in aligned concentric relation, said secondaries coupled in opposition to furnish a resultant output, oscillatable means journalled for motion about its axis relative to and symmetrically of said secondary coils and normal to the axis of said secondary coil, and a core mounted on said means and having a selected profile asymmetrical of the said axis and movable relative to said secondary coils to predetermine the resultant output of said secondaries.

HERMAN SCHAEVITZ.

REFERENCES CITED

The following references are of record in the file of this patent:

UNITED STATES PATENTS

| Number | Name | Date |
| --- | --- | --- |
| 2,379,417 | Conrad | July 3, 1945 |
| 2,393,977 | Dawson et al. | Feb. 5, 1946 |
| 2,419,979 | Wilson | May 6, 1947 |
| 2,430,757 | Conrad et al. | Nov. 11, 1947 |

FOREIGN PATENTS

| Number | Country | Date |
| --- | --- | --- |
| 879,311 | France | Feb. 19, 1943 |